(12) United States Patent
Nakayama

(10) Patent No.: US 8,107,767 B2
(45) Date of Patent: Jan. 31, 2012

(54) DATA TRANSFORM APPARATUS AND CONTROL METHOD THEREOF

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 12/266,338

(22) Filed: Nov. 6, 2008

(65) Prior Publication Data

US 2009/0123087 A1    May 14, 2009

(30) Foreign Application Priority Data

Nov. 13, 2007    (JP) ................................. 2007-294881

(51) Int. Cl.
*G06K 9/36* (2006.01)
*G06F 17/14* (2006.01)

(52) U.S. Cl. ........................................ 382/281; 708/400

(58) Field of Classification Search ........................ None
See application file for complete search history.

(56) References Cited

U.S. PATENT DOCUMENTS

| | | | |
|---|---|---|---|
| 5,581,373 A | 12/1996 | Yoshida et al. | |
| 5,801,650 A | 9/1998 | Nakayama et al. | |
| 5,818,970 A | 10/1998 | Ishikawa et al. | |
| 5,841,381 A | 11/1998 | Nakayama et al. | |
| 5,986,594 A | 11/1999 | Nakayama et al. | |
| 6,408,102 B1 | 6/2002 | Nakayama et al. | |
| 6,549,676 B1 | 4/2003 | Nakayama et al. | |
| 6,553,143 B2 | 4/2003 | Miyake et al. | |
| 6,560,365 B1 | 5/2003 | Nakayama et al. | |
| 6,567,562 B1 | 5/2003 | Nakayama et al. | |
| 6,711,295 B2 | 3/2004 | Nakayama et al. | |
| 6,732,130 B2 * | 5/2004 | Shoji | ............................. 708/400 |
| 6,865,299 B1 | 3/2005 | Nakayama et al. | |
| 6,898,310 B1 | 5/2005 | Ohmi et al. | |
| 6,952,501 B2 | 10/2005 | Nakayama et al. | |
| 6,996,593 B2 | 2/2006 | Nakayama et al. | |

(Continued)

FOREIGN PATENT DOCUMENTS

JP    2003-258645 A    9/2003

(Continued)

OTHER PUBLICATIONS

S. Fukuma, K. Ohyanna, M. Iwahashi, and N. Kambayashi, "Lossless 8-point fast discrete cosine transform using lossless hadamard transform" (Oct. 1999).

(Continued)

*Primary Examiner* — Yuzhen Ge
(74) *Attorney, Agent, or Firm* — Carter, DeLuca, Farrell & Schmidt LLP

(57) ABSTRACT

A data transform apparatus transforms four integer data D0-D3 into one DC coefficient Y0 and three AC coefficients Y1-Y3 as lossless-Hadamard transform coefficients. A first calculation unit group adds date D0 to respective data D1 to D3. A first shifter shifts data D0 1 bit to the left. A second calculation unit group subtracts three data calculated by the first calculation unit group from output of the shifter. A second shifter halves a calculation result of the second calculation unit group by shifting the subtraction result 1 bit to the right, and executes round processing for truncating a fractional part of the halved data. A sign inverter inverts the sign of output from the second shifter, and outputs it as DC coefficient. A third calculation unit group subtracts output from the sign inverter from output of the first calculation unit group, and outputs these data as AC coefficients.

2 Claims, 11 Drawing Sheets

U.S. PATENT DOCUMENTS

| | | | |
|---|---|---|---|
| 7,106,911 B2 | 9/2006 | Ohta et al. | |
| 7,127,115 B2 | 10/2006 | Osawa et al. | |
| 7,188,132 B2 * | 3/2007 | Nakayama | 708/400 |
| 7,194,140 B2 | 3/2007 | Ito et al. | |
| 7,227,998 B2 | 6/2007 | Nakayama et al. | |
| 7,236,997 B2 | 6/2007 | Nakayama et al. | |
| 7,257,264 B2 | 8/2007 | Nakayama et al. | |
| 7,284,026 B2 * | 10/2007 | Nakayama | 708/400 |
| 7,460,729 B2 | 12/2008 | Nakayama et al. | |
| 7,558,815 B2 * | 7/2009 | Mitchell et al. | 708/402 |
| 7,716,265 B2 * | 5/2010 | Nakayama | 708/402 |
| RE42,186 E * | 3/2011 | Nakayama | 382/276 |
| 7,912,318 B2 * | 3/2011 | Nakayama | 382/276 |
| 7,916,962 B2 * | 3/2011 | Nakayama | 382/244 |
| 2004/0006581 A1 | 1/2004 | Nakayama | |
| 2004/0258320 A1 * | 12/2004 | Nakayama | 382/250 |
| 2006/0039626 A1 | 2/2006 | Nakayama et al. | |
| 2007/0025632 A1 | 2/2007 | Nakayama et al. | |
| 2007/0206868 A1 | 9/2007 | Nakayama et al. | |
| 2008/0069464 A1 | 3/2008 | Nakayama et al. | |

FOREIGN PATENT DOCUMENTS

| | | |
|---|---|---|
| JP | 2004-038451 A | 2/2004 |

OTHER PUBLICATIONS

Lossless 2D Discrete Walsh-Hadamard Transform, Proceedings of the 2001 IEEE International Acoustics Speech, and Signal Processing, May 7-11, 2001, Kunitoshi Komatsu et al., vol. 3, pp. 1917-1920.

A Comparative Study of Lossless Audio Coding Schemes, Processings of the 2006 International Conference on Computer Engineering and Systems, Nov. 5-7, 2006, Hendi Ali Elsayed et al., pp. 271-275.

A Lossless Hadamard Transform Using Independence of Lower Bits of Coefficients, The Journal of the Institute of Image Electronics Engineering of Japan, Jul. 25, 2005, Tadayoshi Nakayama et al., vol. 34, No. 4, pp. 398-404.

* cited by examiner

FIG. 9

| STEP | OPERATION |
|---|---|
| 1 | D1+=D0; |
| 2 | D2+=D0; |
| 3 | D3+=D0; |
| 4 | D0<<=1; |
| 5 | D0-=D1; |
| 6 | D0-=D2; |
| 7 | D0-=D3; |
| 8 | D0>>=1; |
| 9 | D0=-D0; |
| 10 | D1-=D0; |
| 11 | D2-=D0; |
| 12 | D3-=D0; |

FIG. 10

| STEP | OPERATION |
|---|---|
| 1 | X2+=X0; |
| 2 | X3-=X1; |
| 3 | t=X3; |
| 4 | t+=X2; |
| 5 | t>>=1; |
| 6 | X0+=t; |
| 7 | t=X2; |
| 8 | t-=X3; |
| 9 | t>>=1; |
| 10 | X1+=t; |
| 11 | X2-=X1; |
| 12 | X3-=X0; |
| 13 | X0=-X0; |

DATA TRANSFORM APPARATUS AND CONTROL METHOD THEREOF

BACKGROUND OF THE INVENTION

1. Field of the Invention

The present invention relates to a data transform technique for transforming integer data using a lossless Hadamard transform and outputting a transform result.

2. Description of the Related Art

An image, particularly a multi-valued image, includes many pieces of information, and requires a very large memory size for storage and a lot of time for transmission. For this reason, when storing or transmitting an image, high-efficiency encoding is used to reduce the data size of the image by performing processing to remove image redundancy or changing the contents of the image to a level at which deterioration of image quality is visually imperceptible.

For example, JPEG, which is recommended by ISO and ITU-T as an international standard encoding method for still image data, computes discrete cosine transforms (DCTs) for respective blocks (8×8 pixels) of image data, thus obtaining DCT transform coefficients. JPEG compresses the image data by quantizing the DCT transform coefficients and entropy-encoding the quantized transform coefficients. As a compression technique using this DCT, H261, MPEG-1/2/4, and the like are known in addition to JPEG.

As partial processing of this DCT transforms or processing for transforming image data, a Hadamard transform is known. The Hadamard transform is an orthogonal transform that uses a transform matrix including elements of only 1 or −1, i.e., a simplest orthogonal transform implemented using only additions and subtractions.

A transform matrix $H_2$ of a 2-point Hadamard transform is defined by:

$$H_2 = \frac{1}{\sqrt{2}} \begin{bmatrix} 1 & 1 \\ 1 & -1 \end{bmatrix} \quad (1)$$

A general N ($=2^n$)-point Hadamard transform matrix $H_N$ can be recursively defined by a Kronecker product between an (N/2)-point Hadamard transform matrix $H_{N/2}$ and the 2-point Hadamard transform matrix $H_2$:

$$\begin{aligned} H_N &= H_{N/2} \otimes H_2 \\ &= \frac{1}{\sqrt{2}} \begin{bmatrix} H_{N/2} & H_{N/2} \\ H_{N/2} & -H_{N/2} \end{bmatrix} \end{aligned} \quad (2)$$

For example, from the above definition, a 4-point Hadamard transform matrix is expressed by:

$$H_4 = \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (3)$$

This transform matrix is called a natural type, and basis vectors are not arranged in sequence order. By repeating substitutions of basis vectors, the basis vectors in the second row are moved to the fourth row, and those in the original third and fourth rows are moved up by one row. Then, a transform matrix $WH_4$ in which the order of the basis vectors is sequence order is generated:

$$WH_4 = \frac{1}{2} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (4)$$

The above transform matrix is called a Walsh type or Walsh-Hadamard transform matrix. The Hadamard transform is known as a reversible orthogonal transform. Both the natural type and Walsh type allow reversible transforms, and their transform matrices are symmetric matrices.

Another symmetric matrix obtained by permuting the basis vectors of the natural type Hadamard transform matrix $H_4$ is available in addition to the Walsh type. That symmetric matrix is a transform matrix $T_4$ which includes diagonal components of +1 as features and is given by:

$$T_4 = \frac{1}{2} \begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (5)$$

The present invention will explain examples using the Hadamard transforms of this type.

Generally speaking, a Hadamard transform is a lossless transform, as described above. However, this merely means a mathematically reversible transform. That is, the reversible transform is premised on the fact that no calculation errors are generated during transform and inverse transform processes, and fixed- or floating-point calculations are required as a data format for this purpose. Also, all significant digit numbers need to be held after the transforms processing.

However, in a Hadamard transform of the type used in transform encoding, and particularly in lossless transform encoding, the number of significant digits are to be reduced as much as possible after the transform processing. More specifically, since fractional part data generated by transforming integer data is considered as a digit number (information) apparently increased from the original data, this fractional part data is to be removed. However, when this fractional part data is simply rounded, reversibility is lost. For example, when four data:

123, 78, 84, 56 undergo Hadamard transform processing using the transform matrix given by equation (5), the transform results are:

170.5, 30.5, 36.5, 8.5

When these values are converted into integers by simply rounding up their fractional parts, we have:

171, 31, 37, 9

It should be noted that the transform matrix given by equation (5) is a transposed matrix. That is, transforming the integer-converted results using equation (5) again is equivalent to inverse transforming, and their inverse transform results are:

124, 78, 84, 56

Upon examining these results, first data "123" becomes "124" via the transform and inverse transform processes. That is, this means that a Hadamard transform that outputs integer-converted data cannot guarantee reversibility.

In the following description, a Hadamard transform that outputs integer-converted data will be referred to as an integer type Hadamard transform, and an integer type Hadamard transform that allows a lossless transform will be referred to as an integer type lossless-Hadamard transform or lossless-Hadamard transform.

Related arts that implement a lossless 4-point-Hadamard transform can be roughly classified into two techniques. One technique uses a Ladder Network (ladder calculations). The other technique executes round processing of a certain rule after a linear Hadamard transform. The former is disclosed in [Shinji Fukuma, Koichi Ohyama, Masahiro Iwahashi, and Noriyoshi Kambayashi, "Lossless 8-point fast discrete cosine transform using lossless Hadamard transform", IEICE technical report, IE99-65, pp. 37-44, October 1999] (to be referred to as reference 1 hereinafter).

The latter is disclosed in Japanese Patent Laid-Open No. 2003-258645 (to be referred to as reference 2 hereinafter).

In reference 1, the lossless transform is implemented by a complicated sequence of decomposing a 4-point Hadamard transform matrix into triangular matrices, and substituting the triangular matrices by ladder calculations. FIG. 8 shows an example of the arrangement of reference 1. As shown in FIG. 8, the circuit arrangement is complicated, and it is hard to intuitively recognize the contents of calculations. For this reason, mistakes upon software or hardware implementation are hard to be found out, and the calculation processing volume is not so small.

On the other hand, a method disclosed in reference 2 as the latter technique rounds up fractional parts of an odd number of data for transform coefficients of fractional part data obtained by the linear Hadamard transforms, and truncates fractional parts of another odd number of data. This reference 2 is characterized by only the method of round processing, but it does not devise to reduce calculations of the linear Hadamard transforms and to reduce a processing volume required for the round processing.

SUMMARY OF THE INVENTION

As described above, since the existing lossless 4-point Hadamard transforms attaches an importance on losslessibility, it is not suited to fast transform processing due to redundant processing. The present invention improves such points.

In order to solve such problems, for example, a data transform apparatus according to the present invention may include a data transform apparatus, which transforms four target data, which are input to first to fourth input terminals and are represented by integers, into one DC coefficient data and three AC coefficient data on a frequency space, which are represented by integers, and outputs the transform results as lossless-Hadamard transform coefficients from first to fourth output terminals. Here, a path which couples the first input terminal that inputs one transform target data of the four transform target data and the first output terminal that outputs the DC coefficient data is defined as a first path, and paths which respectively couple the second to fourth input terminals that input three transform target data except for the one transform target data and the second to fourth output terminals that output the three AC coefficient data are defined as second to fourth paths. Moreover, the apparatus includes a sign inverter which is arranged on the first path and inverts a sign of input data; a converter which is arranged on the first path, and doubles a value of input data; a first calculation unit group which is arranged on the second to fourth paths, and adds or subtracts data to be supplied to the converter to or from the three transform target data; a second calculation unit group which is arranged at a position closer to the first output terminal side than the converter on the first path, and subtracts or adds three calculation results by the first calculation unit group from or to the conversion result of the converter; a rounding unit which is arranged at a position closer to the first output terminal side than the second calculation unit group on the first path, halves an output from the second calculation unit group, converts the halved output to an integer by rounding up or truncating a fractional part, and outputs the integer data toward the first output terminal; and a third calculation unit group which is arranged on the second to fourth paths, subtracts or adds data between the rounding unit and the first output terminal from or to three data obtained by the first calculation unit group, and outputs results to the second to fourth output terminals. Further, data supplied to the first output terminal is output as DC coefficient data, and three data supplied to the second to fourth output terminals are output as AC coefficient data.

According to the present invention, in calculation processing of lossless-Hadamard transform coefficients, addition/subtraction calculation processing for adding and subtracting one data of interest to and from other three data, and processing for adding and subtracting other three data to and from the one data of interest are alternately executed three times, and the one data of interest undergoes round processing during the addition/subtraction calculation processing, thus obtaining lossless transform coefficients.

Hence, since the number of times of round processing can be reduced, and the need for processing for generating and saving intermediate data can be obviated, the lossless-Hadamard transforms can be implemented with a small processing volume.

Furthermore, the number of times of copying of register holding data is reduced under the restriction of a SIMD instruction of a general-purpose CPU. In this way, the total number of processing steps in lossless-Hadamard transform processing and a circuit scale of a lossless-Hadamard transform apparatus can be reduced.

Further features of the present invention will become apparent from the following description of exemplary embodiments with reference to the attached drawings.

BRIEF DESCRIPTION OF THE DRAWINGS

FIG. 9 is a view showing the processing sequence when the transform processing of the first embodiment is implemented by a computer program;

FIG. 10 is a view showing the processing sequence when the conventional lossless 4-point Hadamard transform method is implemented by a computer program;

DETAILED DESCRIPTION OF THE EMBODIMENTS

Embodiments of the present invention will be described in detail hereinafter with reference to the accompanying drawings.

Upon implementing the lossless 4-point Hadamard transforms, four, integer-represented transform target data, are transformed into one DC coefficient data and three AC coefficient data on a frequency space, which are represented by integers. At this time, it is important that when one of four transform coefficients is calculated by truncating its fractional part, the other three transform coefficients are calculated by rounding up their fractional parts. On the other hand, when one transform coefficient is calculated by rounding up its fractional part, the other three AC coefficients are calculated by truncating their fractional parts.

Figure 1:
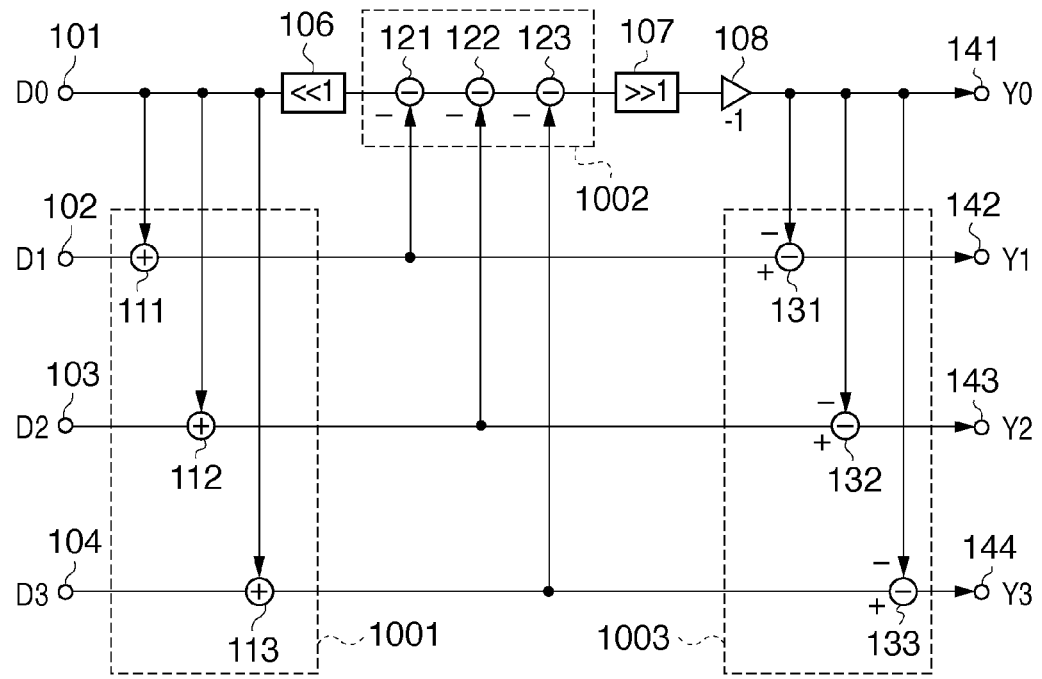
FIG. 1 is a circuit diagram showing the arrangement of a data transform apparatus which implements a lossless 4-point Hadamard transform according to the first embodiment.

FIG. 1 shows the circuit arrangement of a data transform apparatus (lossless 4-point Hadamard transform apparatus) according to the first embodiment of the present invention, and the control processing contents of this apparatus will be described below.

Referring to FIG. 1, reference numerals 101 to 104 denote terminals (first to fourth input terminals) for inputting four, integer-represented data D0, D1, D2, and D3 (transforms target data).

Reference numerals 111 to 113 denote adders. These three adders form a first calculation unit group 1001. Reference numerals 121 to 123 denote subtractors. These three subtractors form a second calculation unit group 1002. Reference numerals 131 to 133 denote subtractors. These three subtractors form a third calculation unit group 1003. Reference numeral 141 to 144 denote output terminals (first to fourth output terminals) for outputting lossless-Hadamard transform results as Y0 to Y3. Y0 represents a DC coefficient obtained by the Hadamard transform, and Y1 to Y3 represent AC coefficients obtained by that transform.

Assume that a path that couples D0–Y0 is defined as a first path, and paths that couple D1–Y1, D2–Y2, and D3–Y3 are respectively defined as second to fourth paths. Then, the first calculation unit group 1001 shown in FIG. 1 is arranged on the second to fourth paths, the second calculation unit group 1002 is arranged on the first path, and the third calculation unit group is arranged on the second to fourth paths.

Reference numeral 106 denotes a shifter which shifts input data 1 bit to the left (more significant direction). That is, this shifter serves as a converter for doubling the input data value. Reference numeral 107 denotes a shifter (divider) which shifts the calculation result input from the subtractor 123 1 bit to the right (less significant direction). That is, this shifter 107 serves as a rounding unit which halves input data, and truncates a fractional part of the halved data. Reference numeral 108 denotes a sign inverter, which inverts the sign of data as a processing result of the shifter 107.

The calculation contents in the arrangement shown in FIG. 1 will be described below.

The three adders 111 to 113 which form the first calculation unit group 1001 add input data D0 input to the first input terminal to other three input data D1, D2, and D3 input to the second to fourth input terminals, and output addition results D0+D1, D0+D2, and D0+D3.

The shifter 106 shifts the input data D0 1 bit to the left, and outputs the shift result. That is, the shifter 106 serves as a converter which executes processing for doubling input data, and outputs that processing result. Note that a value obtained by shifting integer data X 1 bit to the left is expressed by "X<<1", and a value obtained by shifting data X 1 bit to the right is expressed by "X>>1". Therefore, the output value from the shifter 106 can be expressed by "D0<<1". The processing of this shifter 106 is equivalent to doubling of the input data D0. However, since this processing is paired with 1-bit right shift processing by the shifter 107 to be described later, it is expressed as 1-bit left shift processing in this embodiment.

The three addition results output from the adders 111 to 113 are supplied to the three subtractors 121 to 123 which form the second calculation unit group 1002. As a result, data output from the subtractor 123 located at the rearmost position of the second calculation unit group 1002 is given by:

$$(D0 << 1) - (D0 + D1) - (D0 + D2) - (D0 + D3) =$$
$$2 \times D0 - 3 \times D0 - D1 - D2 - D3 = -D0 - D1 - D2 - D3$$

As can be understood from the above description, this calculation result is a "−2-fold" value of a DC coefficient of equation (5) above. Then, the shifter 107 applies 1-bit right shift processing to this subtraction result, and the sign inverter 108 inverts the positive or negative sign of the processing result. Hence, the output from this sign inverter 108, i.e., DC component data Y0 to be output from the first output terminal 141 is given by:

$$Y0 = -((-D0 - D1 - D2 - D3) >> 1) \quad (6)$$
$$= (D0 + D1 + D2 + D3 + 1) >> 1$$

In the 1-bit right shift processing, fractional part data generated upon dividing by 2 is truncated as round processing. In this calculation, since a fractional part is only 1 bit, an error which is generated by the 1-bit right shift processing and assumes a maximum absolute value (to be referred to as a maximum rounding error hereinafter) is −0.5.

When the sign is inverted after the round processing, the sign of the error generated by truncating is also inverted, and the maximum rounding error is 0.5. This error is the same as a rounding error obtained when a fractional part is rounded up. Hence, when the round processing is applied to sign-inverted data, the same result cannot be obtained unless a fractional part is rounded up.

In equation (6), the reason why the 1-bit right shift processing is executed after the sign-inverted data are added and "+1" is to attain a calculation for rounding up a fractional part, as described above. As a result of the calculations executed so far, a DC coefficient of an integer is obtained by rounding up a fractional part, and is output as data Y0 from the terminal 141.

The DC coefficient data Y0 obtained in this way is input to the three subtractors 131 to 133 which form the third calculation unit group 1003. The subtractors 131 to 133 subtract the DC coefficient Y0 from the output values of the three adders 111 to 113, and output the results toward the second to fourth output terminals 142-144, respectively. With these subtractions, AC coefficient data Y1 to Y3 are obtained. These data Y1 to Y3 are respectively given by:

$$Y1 = D0 + D1 - ((D0 + D1 + D2 + D3 + 1) >> 1) \quad (7)$$
$$= (D0 + D1 - D2 - D3) >> 1$$

$$Y2 = D0 + D2 - ((D0 + D1 + D2 + D3 + 1) >> 1) \quad (8)$$
$$= (D0 - D1 + D2 - D3) >> 1$$

$$Y3 = D0 + D3 - ((D0 + D1 + D2 + D3 + 1) >> 1) \quad (9)$$
$$= (D0 - D1 - D2 + D3) >> 1$$

Since the integer DC coefficient obtained by rounding up a fractional part is subtracted, a rounding error obtained by inverting the sign of the maximum rounding error (0.5) superposed on that DC coefficient is superposed on respective AC coefficient data.

That is, a maximum rounding error of −0.5 is superposed on each AC coefficient data. This error is the same as the rounding error generated by the truncating round processing.

Hence, since all of the three integer AC coefficients of this embodiment are substituted by transform equations that round fractional parts by truncating processing, equations can be modified as shown in equations (7) to (9).

As can be understood from the above description, the output results given by equation (6) and equations (7) to (9) correspond to lossless-Hadamard transform results using the Hadamard transform matrix $T_4$ given by equation (5) above. That is, in this embodiment, since the number of transform coefficients that have undergone the truncating processing is odd (1), and the number of transform coefficients that have undergone the round-up processing is also odd (3), Hadamard transform coefficients obtained by this arrangement are lossless transform coefficients.

In addition, since only the DC coefficient has undergone the round processing different from other transform coefficients, inverse transform processing can be implemented by the same round processing. This means that the arrangement of FIG. 1 allows lossless inverse transform processing.

As described above, the data transform apparatus according to the first embodiment serves as a lossless 4-point Hadamard transform apparatus.

When a general-purpose microprocessor (CPU) executes the aforementioned lossless-Hadamard transforms as transform processing in transform encoding, fast transform processing can be implemented using a parallel calculation function of parallelly processing data of a plurality of blocks.

This function is called a SIMD (Single Instruction stream Multiple Data stream) type instruction used to divide a 64- or 128-bit register into four or eight, and to parallelly process 8- or 16-bit data, and is normally embedded in recent CPUs.

This SIMD type instruction generally has a 2-operand format, and a calculation result between a source register and destination register is stored in the destination register.

Upon evaluating the number of software processing steps of the arrangement shown in FIG. 1 under that condition, this software processing requires 12 steps, as shown in FIG. 9. Since there is no substitution statement for copying a value from a certain variable to another variable, the number of times of addition/subtraction is 9.

Figure 8:
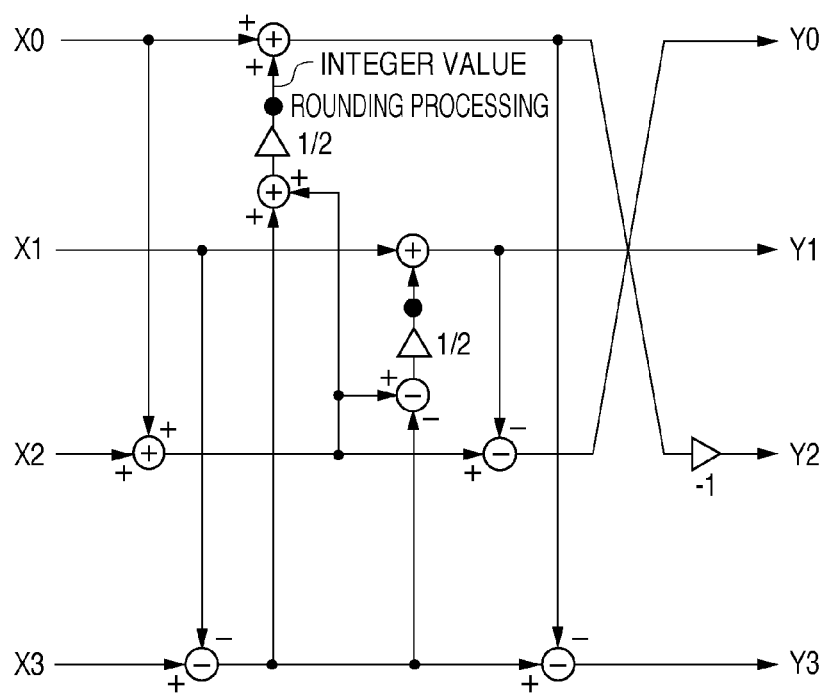
FIG. 8 is a circuit diagram showing the arrangement of a conventional lossless 4-point Hadamard transform apparatus.

In this connection, software processing corresponding to the arrangement shown in FIG. 8 is expressed, as shown in FIG. 10, and requires 13 steps. In addition, some transform data need to be substituted. The 13 steps shown in FIG. 10 do not include any substitution.

The related art requires application of round processing two or four data. By contrast, this embodiment requires only one round processing, and the number of times of data copying is zero. As can be understood from the above description, the software processing shown in FIG. 9 can implement the lossless-Hadamard transforms by a fewer number of calculations than before in many items of the round processing, copy processing, and the like.

In the first embodiment, ½ processing for truncating a fractional part of the calculation result of the second calculation unit group 1002 is implemented by the 1-bit right shift processing of the shifter 107. However, the present invention is not limited to such specific processing. For example, in place of the shifter 107, a ½ calculation unit which holds fractional part data and a rounding unit which rounds up a fractional part of the result of this ½ calculation unit may be arranged. In this case, the ½ calculation unit halves the calculation result from the second calculation unit group 1002, and outputs a value including a fractional part to the rounding unit. The rounding unit adds "0.5" to the value from the ½ calculation unit, and then truncates a fractional part of the sum to convert it into an integer. Then, the rounding unit may output the result to the sign inverter 108. The same applies to other modifications and other embodiments to be described hereinafter.

In case of hardware implementation of this embodiment, the shifter 106 can be implemented by assigning bits 0 to M (M may be determined as needed according to the design) of input data to signal lines of output bits 1 to M+1, and outputting "0" from output bit 0. The shifter 107 can be implemented by conversely assigning input bits 1 to M+1 to output bits 0 to M. That is, since the shifters 106 and 107 can be simply implemented by circuit interconnections, a time required for this can be ignored in practice. The same applies to other modifications and other embodiments to be described hereinafter.

Figure 2:
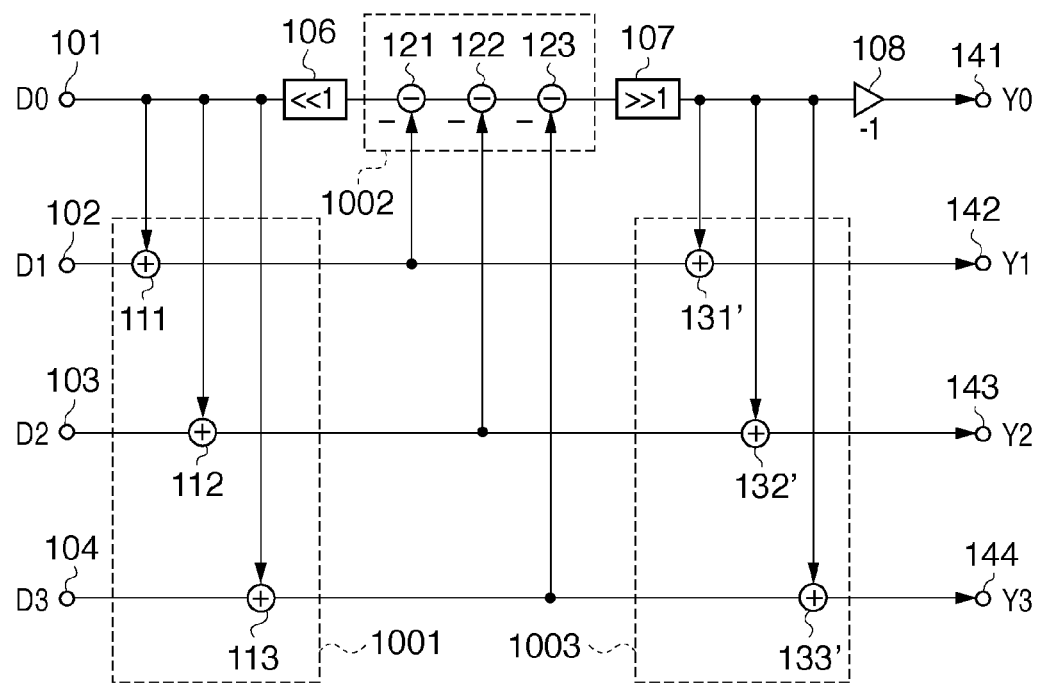
FIG. 2 is a circuit diagram showing the arrangement of a data transform apparatus according to the first modification of the first embodiment.

FIG. 2 shows the arrangement similar to that of the first embodiment. Differences between FIGS. 2 and 1 lie in that the position of the sign inverter 108 is moved to the first output terminal side, adders 131' to 133' are used as a new third calculation unit group 1003 in place of the subtractors 131 to 133 in the third calculation unit group 1003.

Subtraction after sign inversion is equivalent to addition without sign inversion. Therefore, as is easily understood from the above description, the arrangement of FIG. 2 is equivalent to FIG. 1.

Figure 3:
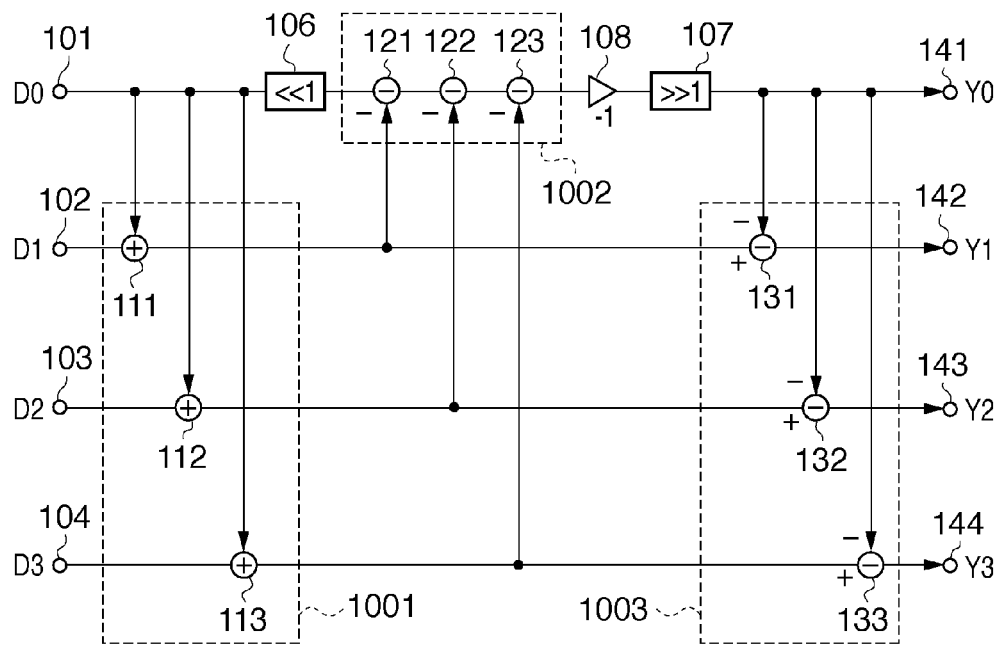
FIG. 3 is a circuit diagram showing the arrangement of a data transform apparatus according to the second modification of the first embodiment.

In the arrangement shown in FIG. 2, the sign inverter 108 in FIG. 1 is moved to the first output terminal side. FIG. 3 shows the arrangement in which the sign inverter 108 is moved to the input side, i.e., to a position before the shifter 107, conversely. However, the arrangement of FIG. 3 is not equivalent to that of FIG. 1.

Since the integer DC coefficient data Y0 output from the terminal 141 is the output from the 1-bit right shifter 107, the round processing of this DC coefficient is truncating processing. As a result, the round processing of the three AC coefficient data Y1 to Y3 generated by subtracting this DC coefficient is round-up processing.

That is, in FIG. 1, the integer DC coefficient data Y0 is obtained by rounding up its fractional part, and other three AC coefficient data Y1 to Y3 are obtained by truncating their fractional parts. However, FIG. 3 uses opposite round processes. Hence, the arrangement of FIG. 3 is not equivalent to FIG. 1. However, as is easily understood from the above description, even the arrangement of FIG. 3 can implement the lossless transforms.

Figure 4:
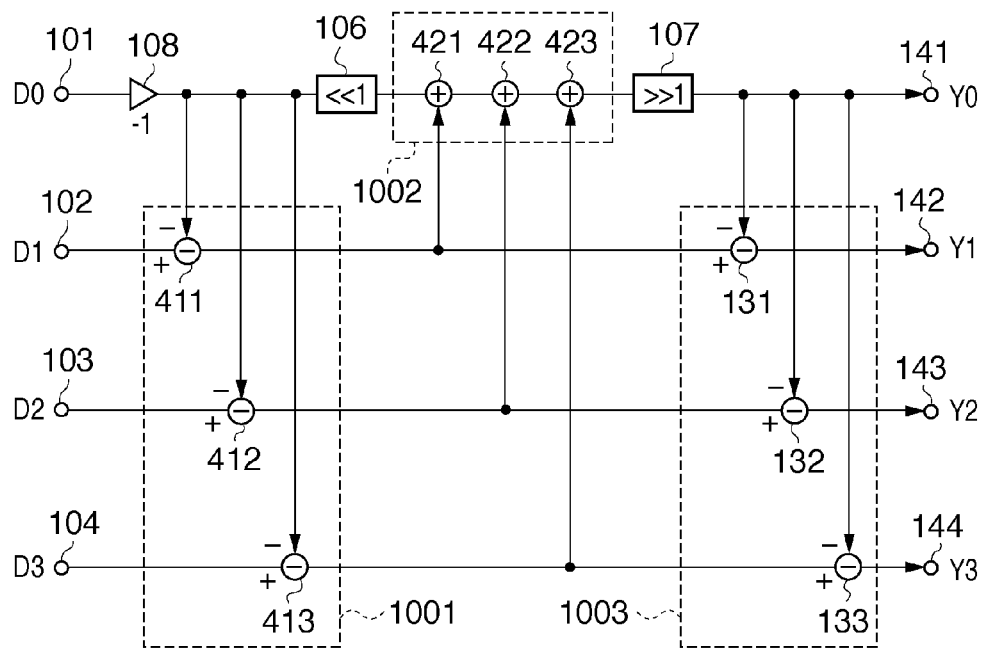
FIG. 4 is a circuit diagram showing the arrangement of a data transform apparatus according to the third modification of the first embodiment.

FIG. 4 shows the arrangement in which the sign inverter 108 in the second modification is further moved to the input side. Referring to FIG. 4, reference numerals 411 to 413 denote subtractors; and 421 to 423, adders. As for other components, the same reference numerals denote components having functions common to those in FIG. 1, and a repetitive description thereof will not be repeated.

As can be easily understood from the above description, the arrangement of FIG. 4 is equivalent to that of FIG. 3.

Figure 5:
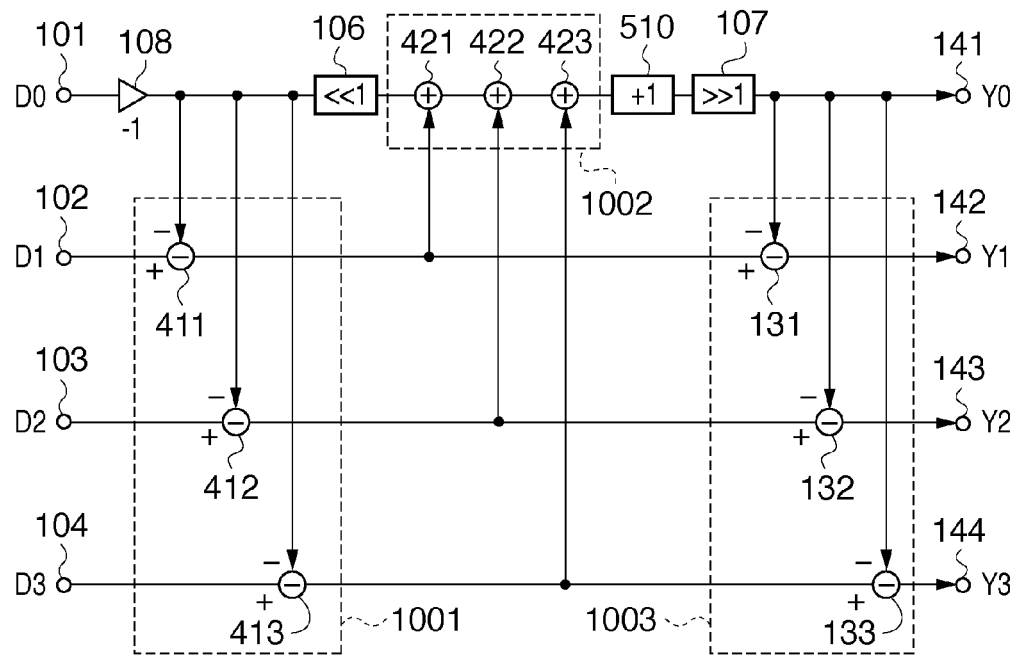
FIG. 5 is a circuit diagram showing the arrangement of a data transform apparatus according to the fourth modification of the first embodiment.

In FIG. 4, the DC coefficient data Y0 is obtained by truncating its fractional part, and other three AC coefficient data Y1 to Y3 are obtained by rounding up their fractional parts. By slightly modifying the arrangement of FIG. 4, the round processing required to obtain the DC coefficient data Y0 can be round-up processing, and that required to obtain other three AC coefficient data Y1 to Y3 can be truncating processing as in FIG. 1. FIG. 5 shows that example. A difference between FIGS. 5 and 4 is that a +1 circuit 510 is added before the shifter 107.

The +1 circuit 510 adds "+1" to the addition result output from the adder 423, and outputs the result to the shifter 107. Since the shifter 107 shifts the value from this +1 circuit 510 1 bit to the right, the integer DC coefficient data Y0 output from the terminal 141 is equivalent to that which has undergone the round-up processing. The integer AC coefficient data Y1 to Y3 output from other output terminals are equivalent to results obtained by round processing using truncating. Therefore, as can be seen from the above description, the arrangement of FIG. 5 is equivalent to those of FIGS. 1 and 2.

Figure 6:
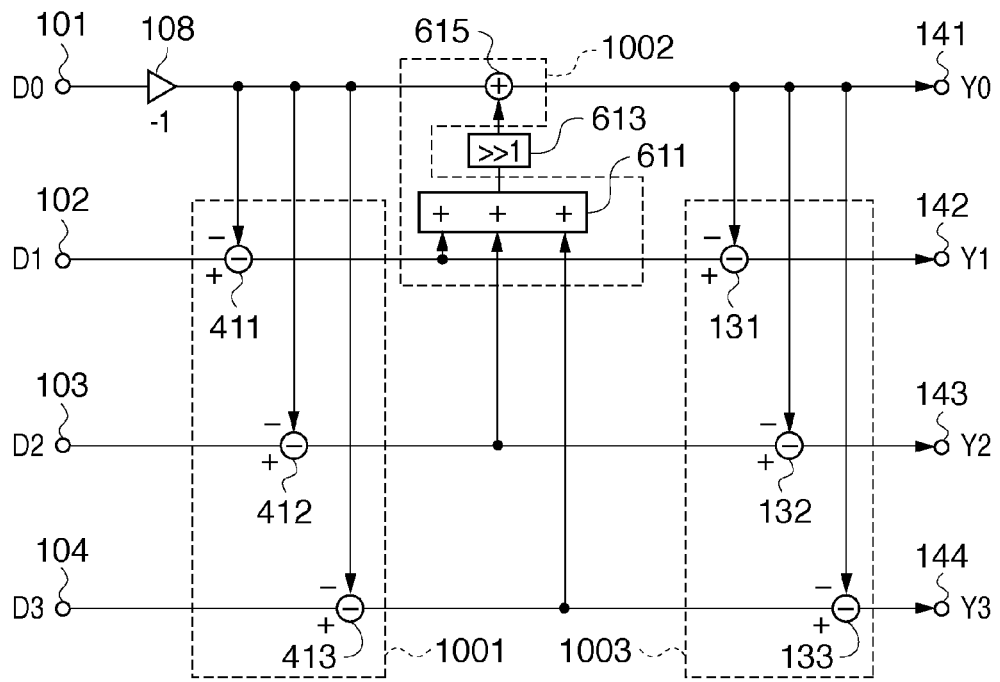
FIG. 6 is a circuit diagram showing the arrangement of a data transform apparatus according to the fifth modification of the first embodiment.

FIG. 6 shows another arrangement equivalent to FIGS. 3 and 4. In FIG. 4, the data D0 undergoes shift processing. However, in the arrangement of FIG. 6, data other than D0, i.e., data to be added to or subtracted from D0 are combined and then undergo shift processing.

Referring to FIG. 6, reference numeral 611 denotes a 3-input summation unit which summates three data D1, D2, and D3 out of four input data. Reference numeral 613 denotes a shifter which shifts the output from the summation unit 611 1 bit to the right. Reference numeral 615 denotes an adder which adds the output from the shifter 613 to the input data D0. Since other components are the same as those denoted by the same reference numerals as in FIG. 4, a repetitive description thereof will not be repeated. In the arrangement of FIG. 6, the aforementioned summation unit 611 and adder 615 form the second calculation unit group 1002. Equivalence between FIGS. 4 and 6 will be demonstrated by comparison with FIG. 4.

In FIG. 4, the input data D0 undergoes sign inversion, and is then shifted 1 bit to the left. Then, three data other than the input data D0 are added to the data D0, and the addition result is shifted 1 bit to the right. This processing yields the same result as that obtained when three input data D1, D2, and D3 are summated by the summation unit 611, this summation result is shifted 1 bit to the right, and the shift result is added to the input data D0.

Since a value obtained by inverting the sign of the input data D0 and shifting the sign-inverted data D0 1 bit to the left is an even value, the parity (which of odd and even) of summation data necessarily matches that of a value obtained by adding the summation data to the input data D0.

The two data, the parties of which match, have the same value to be truncated by the 1-bit right shift processing, and also the same rounding error. Hence, the same result is obtained even when the shift processing is applied either before or after the addition.

To summarize, the arrangement shown in FIG. 6 can be construed as that obtained by adding the following two changes to FIG. 4.

(i) The three data D1 to D3 to be added to sign-inverted data of the input data D0 are summated by the summation unit 611. Then, the arrangement is modified to apply the 1-bit right shift processing to only this summation data.

(ii) With the change of (i), the 1-bit left shift processing and 1-bit right shift processing with respect to the sign-inverted data of the input data D0 cancel each other, and have no significance, the 1-bit left shift processing is deleted.

As can be seen from the above description, the arrangement shown in FIG. 6 is equivalent to that shown in FIG. 4.

Figure 7:
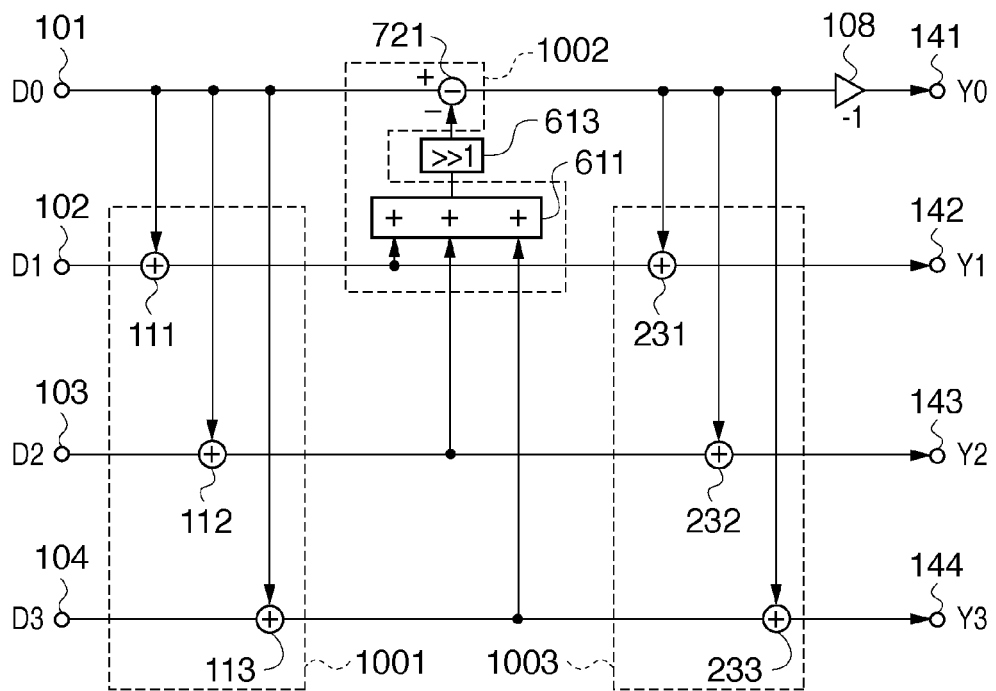
FIG. 7 is a circuit diagram showing the arrangement of a data transform apparatus according to the sixth modification of the first embodiment.

FIG. 7 shows the arrangement in which the position of the sign inverter 108 in FIG. 6 is moved from the input side to the output side. Upon moving the sign inverter 108 located on the data path of the input data D0, additions and subtractions with respect to the D0 data path replace each other before and after movement, and additions and subtractions from that data path to other data also replace each other.

More specifically, the adder 615 is replaced by a subtractor 721, the subtractors 411 to 413 are replaced by the adders 111 to 113, and the subtractors 131 to 133 are replaced by the adders 231 to 233.

Upon examining the round processing of the D0 data path, data obtained when a value truncated by the 1-bit right shifter 613 undergoes subtraction by the subtractor 721 apparently becomes rounded-up data. When the sign inverter 108 inverts the sign of this data, apparently truncated data is output. On the other hand, since AC coefficients are generated by adding rounded-up data before sign inversion, they are output as rounded-up data.

Hence, the round processes of respective outputs in the arrangement of FIG. 7 are the same as those of the DC and AC coefficients obtained from the arrangement of FIG. 3. Hence, the arrangement of FIG. 7 is equivalent to that shown in FIG. 3.

The first embodiment and its modifications have been explained. As can be seen from an overview of the above seven arrangements, the three arrangements in FIGS. 1, 2, and 5 are equivalent to each other, and the four arrangements in FIGS. 3, 4, 6, and 7 are equivalent to each other.

As can be seen from comparison between FIG. 2 in which the sign inverter 108 is closest to the output side and FIG. 4 in which the sign inverter is closest to the input side, all adders and subtractors replace each other as calculation units in the three calculation unit groups.

Figure 11:
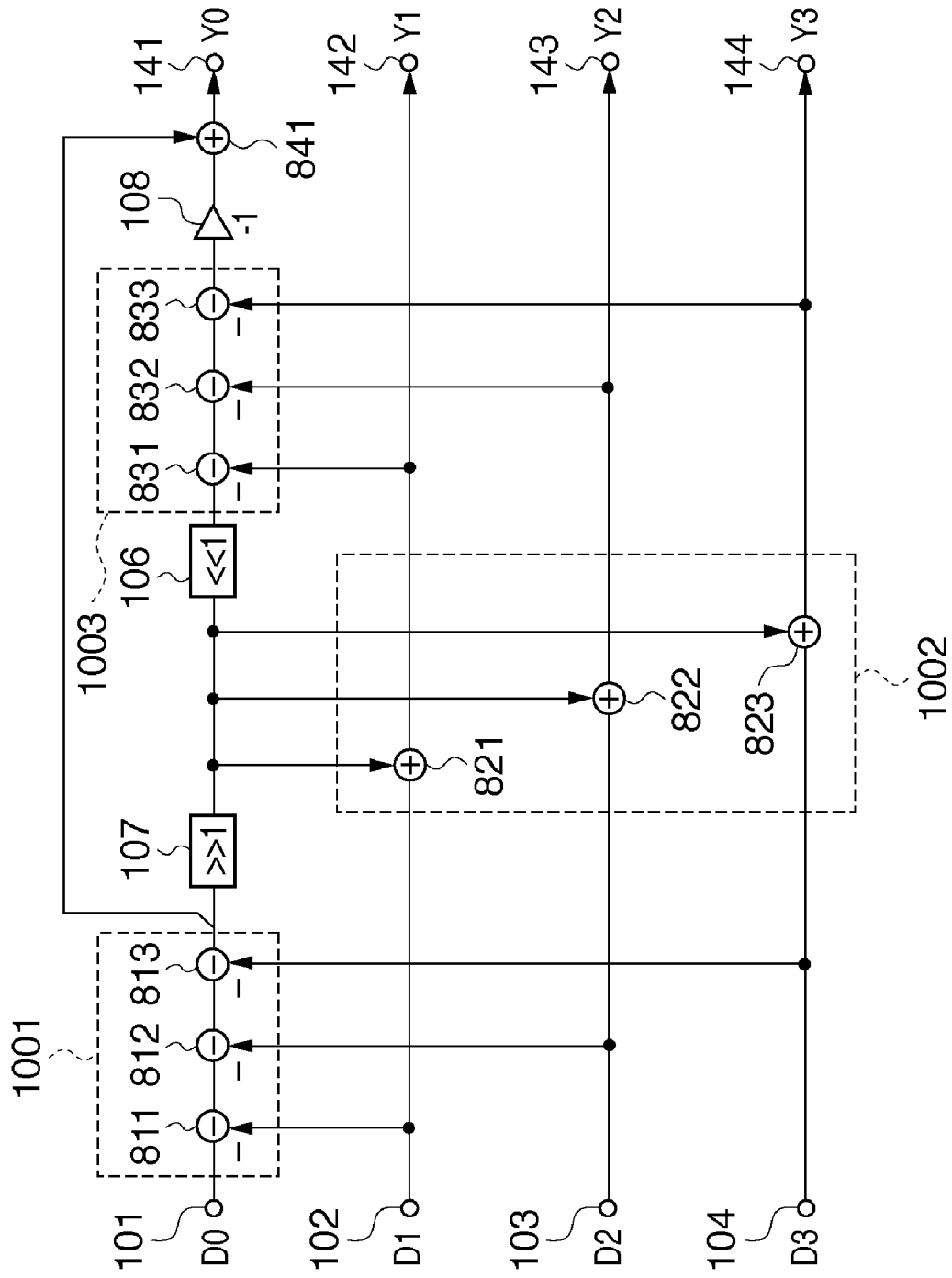
FIG. 11 is a circuit diagram showing the arrangement of a data transform apparatus which implements a lossless 4-point Hadamard transform according to the second embodiment.

FIG. 11 shows the arrangement according to the second embodiment of the present invention. Referring to FIG. 11, reference numerals 811 to 813 denote three subtractors which form a first calculation unit group 1001; 821 to 823, three adders which form a second calculation unit group 1002; and 831 to 833, three subtractors which form a third calculation unit group 1003. In FIG. 1, the first and third calculation unit groups 1001 and 1003 are arranged on the second to fourth paths, and the second calculation unit group 1002 is arranged on the first path. It should be noted that in FIG. 11, this layout relationship is reversed, i.e., the first and third calculation unit groups 1001 and 1003 are arranged on the first path, and the second calculation unit group 1002 is arranged on the second to fourth paths.

Reference numeral 841 denotes an adder which adds a least significant bit (LSB) of the calculation result by the first calculation unit group 1001.

As for other components, the same reference numerals denote components having functions common to those in FIG. 1, and a repetitive description thereof will not be repeated.

In the second embodiment, before the calculation processing of the second calculation unit group 1002, a shifter 107 shifts the calculation result of the first calculation unit group 1001 1 bit to the right.

A value after the 1-bit right shift processing of the shifter 107 is equal to a value obtained by truncating the LSB of the calculation result of the first calculation unit group 1001 and dividing that result by 2. In other words, that value is equal to a result obtained by dividing the calculation result of the first calculation unit group 1001 by 2, and truncating that quotient.

Hence, since a rounding error "−0.5" due to truncating is superposed on three AC coefficients of the second embodiment, which are generated by adding the 1-bit shifted value, they are equal to truncated data.

In the third calculation unit group 1003, when all the three AC coefficients are subtracted from the same data, the rounding errors superposed on the respective AC coefficients are concentrated on the minuend data. A maximum rounding error of the concentrated rounding errors is as large as "+1.5".

Since data which undergoes the 1-bit right shift processing and then 1-bit left shift processing is equal to a value obtained by truncating the LSB of original data, if the original data is an odd value, a truncating error "−1" (maximum rounding error) is superposed on the left-shifted data.

Since addition of the concentrated rounding errors to the truncating error yields +0.5, that data is construed as that which has undergone round processing having a maximum rounding error of "+0.5", i.e., round-up processing.

After that, since sign inversion processing is applied, a rounding error as a maximum rounding error "−0.5" is superposed on a DC coefficient output obtained when LSB addition processing to be described later is ignored, and that DC coefficient apparently becomes truncated transform coefficient data.

Hence, since the apparent round processing of the DC coefficient is the same as that of the AC coefficients, and all transform coefficients are truncated, these transform coefficients cannot be lossless transform coefficients.

In order to avoid this, data needs to be converted into apparently rounded-up data, so that a maximum rounding error superposed on the DC coefficient to be output becomes "+0.5".

Thus, the adder 841 adds the LSB (1 bit) of the calculation result of the first calculation unit group 1001 to the calculation result of the third calculation unit group 1003, and outputs the result as a DC coefficient.

When the calculation result of the first calculation unit group 1001 is an even value, since no rounding error due to the 1-bit right shift processing is generated, no rounding error is superposed on the lossless transform coefficient as an output result. In this case, since the LSB=0, no problem is posed if that LSB is added to the DC coefficient.

On the other hand, when the calculation result of the first calculation unit group 1001 is an odd value, the value of the LSB is 1, and a rounding error is superposed on the transformed coefficient data. Using this LSB, the rounding error of the DC coefficient becomes the same as that upon round-up processing.

Since a rounding error "−0.5" is superposed on a truncated transform coefficient, and a rounding error "+0.5" is superposed on a rounded-up transform coefficient, the adder 841 adds the LSB having the value "1" to the DC coefficient so that the rounding error to be superposed on the DC coefficient becomes +0.5.

With the aforementioned processing, the DC coefficient has the same rounding error as that obtained after the round-up processing, and the three AC coefficients have the same rounding errors as those obtained after the truncating processing, thus obtaining lossless transform coefficients.

Figure 12:
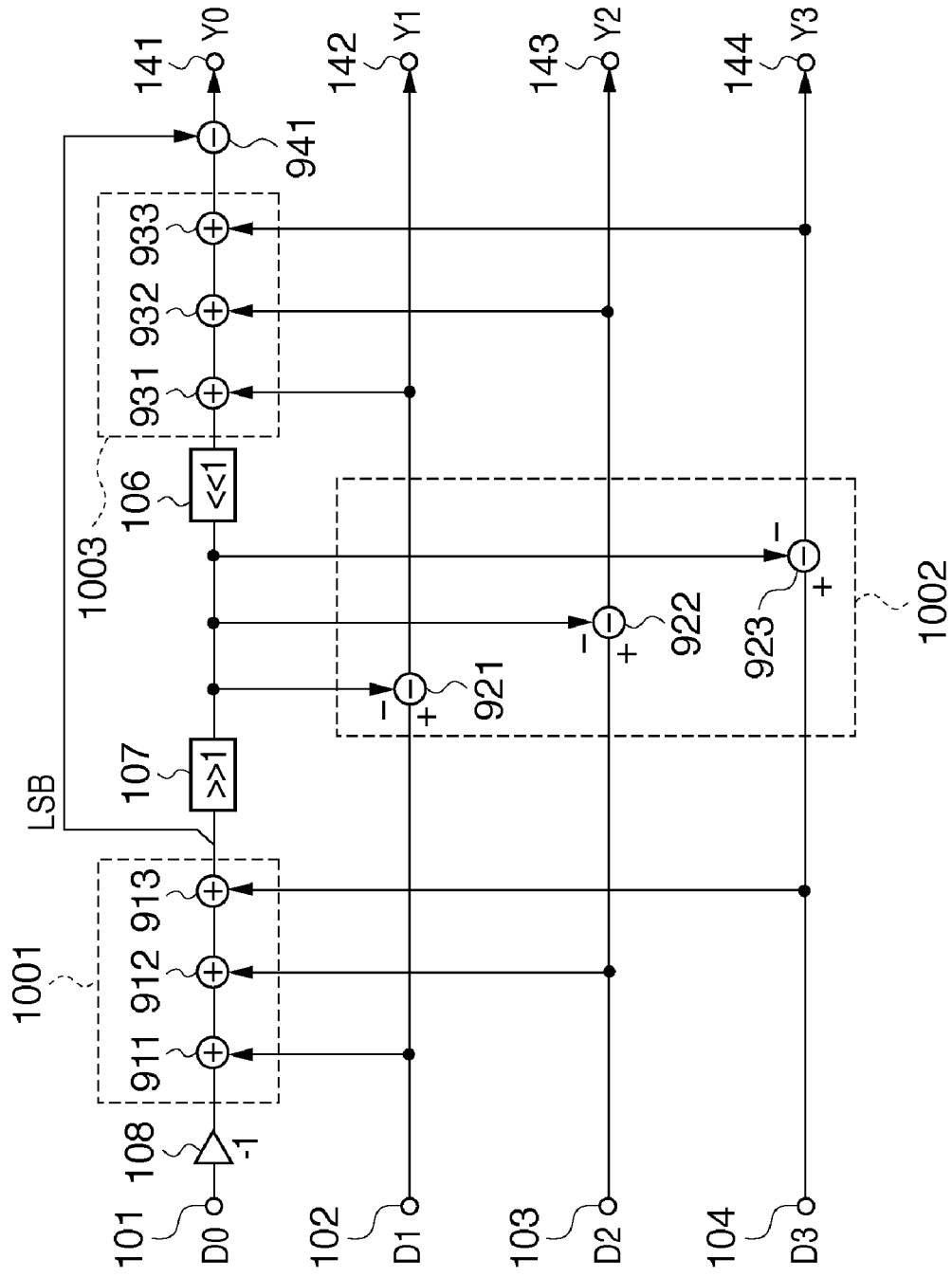
FIG. 12 is a circuit diagram showing the arrangement of a data transform apparatus according to the first modification of the second embodiment.

FIG. 12 shows the arrangement in which a sign inverter 108 in FIG. 11 of the second embodiment is moved to the input side, and will be described below as the first modification of the second embodiment.

As can be seen from the relationship between FIGS. 2 and 4 in the aforementioned first embodiment, by moving the sign inversion processing to the input side, all adders in FIG. 11 are substituted by subtractors, and all subtractors are substituted by adders.

Hence, adders 911 to 913 form the first calculation unit group 1001. Subtractors 921 to 923 form the second calculation unit group 1002. Adders 931 to 933 form the third calculation unit group 1003. Other components are common to those in FIG. 1.

A value obtained by shifting the calculation result of the first calculation unit group 1001 1 bit to the right by the shifter 107 is equal to a result obtained by dividing that calculation result by 2, and truncating the quotient. The apparent round processing of the AC coefficients generated by subtracting the shift result using the second calculation unit group 1002 is round-up processing opposite to truncating processing.

Since the apparent round processing of the AC coefficients in the arrangement shown in FIG. 11 is truncating processing, the arrangement shown in FIG. 12 is not equivalent to that shown in FIG. 11, and the relationship between the round processes is inverted.

A rounding error as a maximum rounding error "+0.5" is superposed on the AC coefficient outputs of the first modification, and that rounding error is added to the DC coefficient by the adders 931 to 933 as the third calculation unit group 1003.

Since a rounding error as a maximum rounding error "−1.0" is also superposed on the DC coefficient by the 1-bit right shift processing by the shifter 107 and 1-bit left shift processing by a shifter 106, a rounding error of a total of "+0.5" is superposed on the DC coefficient.

In this state, the apparent rounding error of the DC coefficient is that to be generated by the round-up processing, which is the same as the round processing of the AC coefficients. For this reason, for the contradictory reason to that described in the second embodiment, a subtractor 941 subtracts the LSB from the DC coefficient to change the apparent round processing of the DC coefficient to the truncating processing, so that the transform coefficients become lossless transform coefficients.

Figure 13:
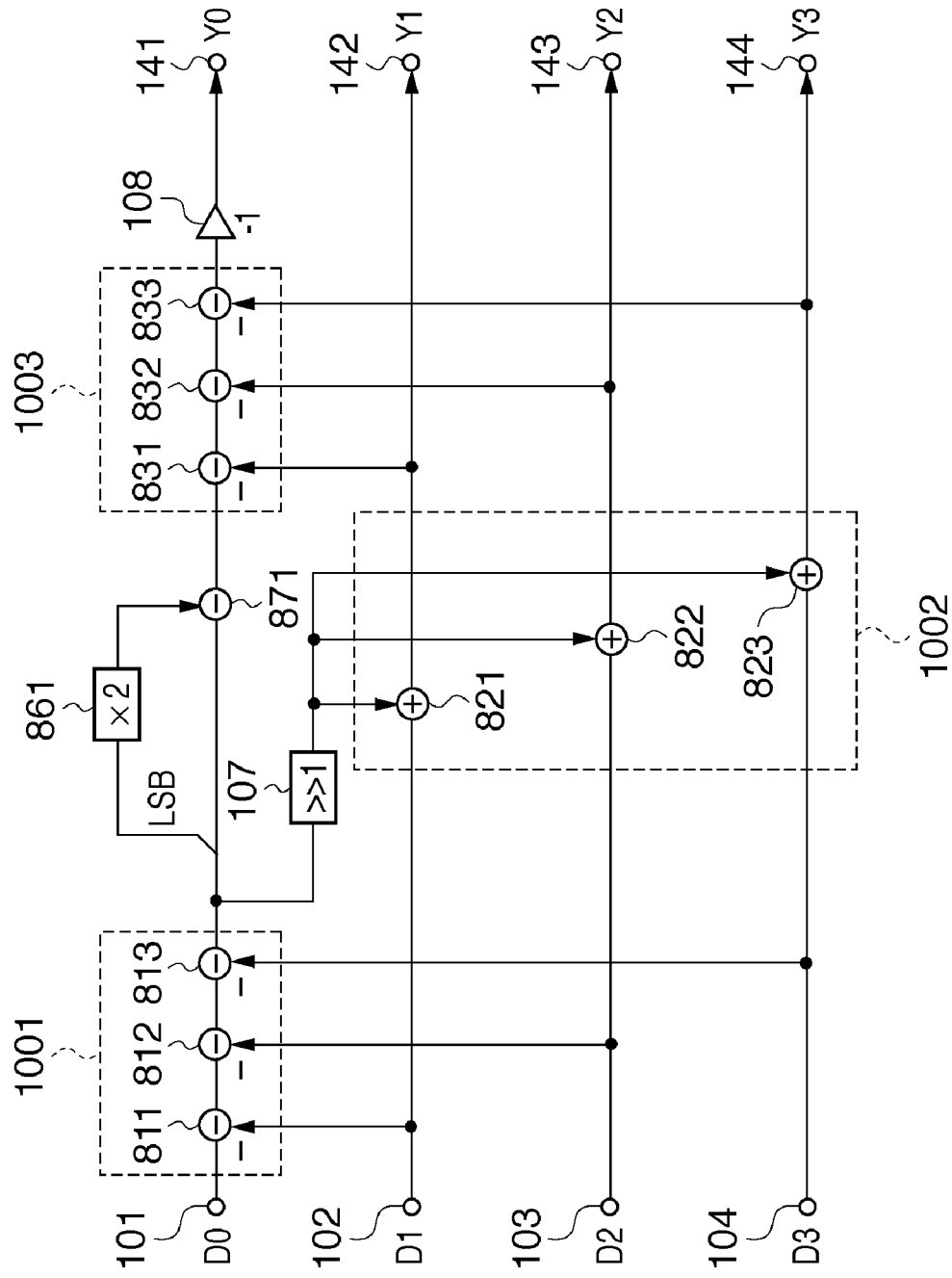
FIG. 13 is a circuit diagram showing the arrangement of a data transform apparatus according to the second modification of the second embodiment.

FIG. 13 shows the arrangement according to the second modification of the second embodiment. Referring to FIG. 13, reference numeral 861 denotes a 1-bit shifter which doubles the LSB of the calculation result of the first calculation unit group 1001. Reference numeral 871 denotes a subtractor which subtracts the value "LSB×2" doubled by the shifter 861 from intermediate calculation data. Other components are common to those denoted by the same reference numerals as in FIG. 11.

The second modification of the second embodiment is characterized in that the calculation result of the first calculation unit group 1001, which has undergone the 1-bit right shift processing, is not used after the left shift processing, but the calculation result before the 1-bit right shift processing is used intact.

The subtractor 871 subtracts a value obtained by doubling the LSB by the shifter 861 from the calculation result of the first calculation unit group 1001, thus generating a difference of a maximum rounding error "−2" (the following description will be given while also construing this error as a superposed rounding error).

When an error "+1.5" superposed upon subtracting the AC coefficients is added to the superposed error, a superposed error of a total of "−0.5" is generated. The superposed error is actually generated only when the LSB=1.

Since this superposed error is inverted to "+0.5" by the sign inverter 108, the apparent round processing of the DC coefficient error output from a terminal 141 is round-up processing.

Since the round processing of the AC coefficients is truncating processing, as described in the second embodiment (FIG. 11), the DC and AC coefficients are lossless transform coefficients. Incidentally, the arrangement of FIG. 13 is equivalent to that of FIG. 11.

Figure 14:
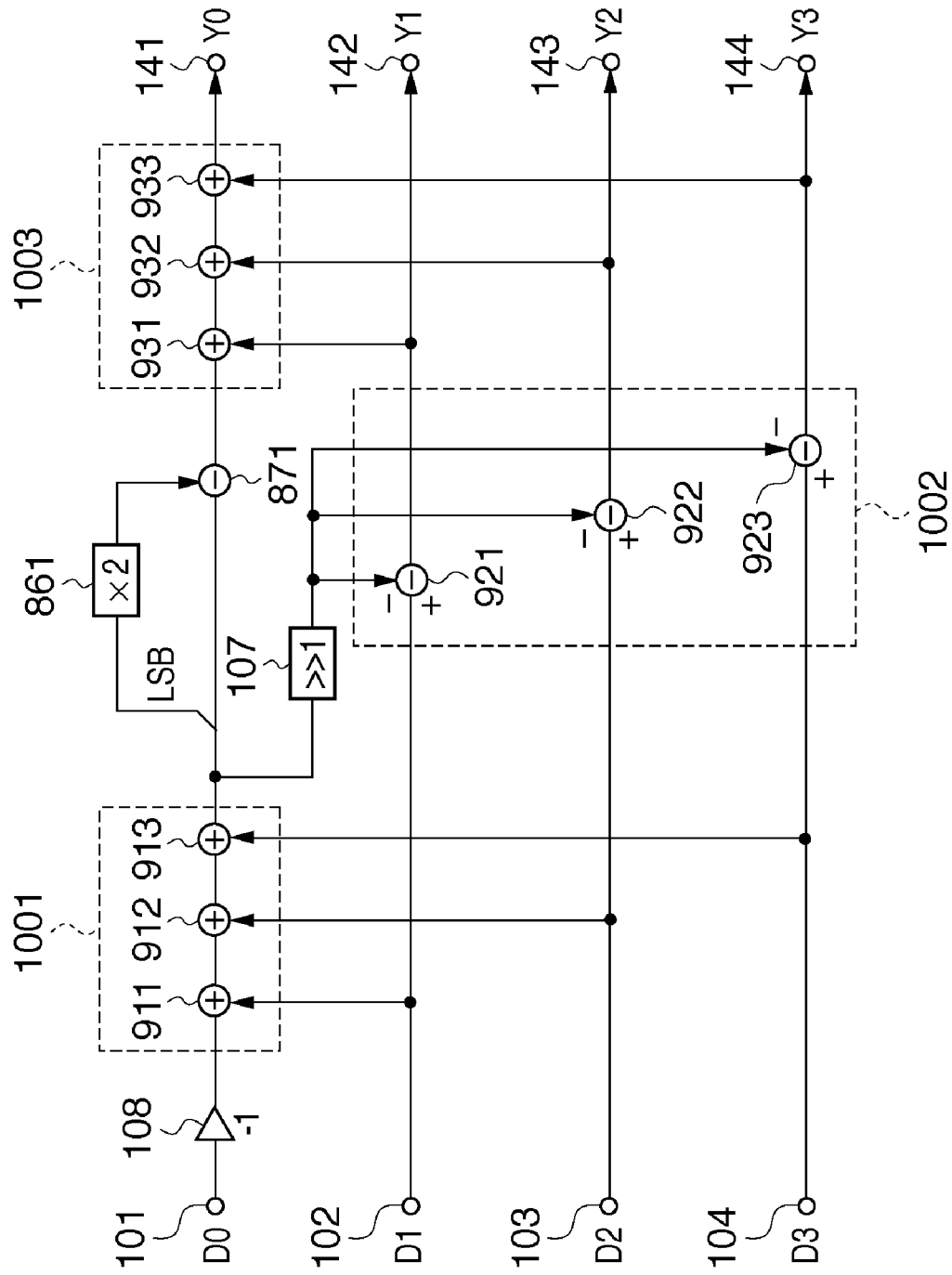
FIG. 14 is a circuit diagram showing the arrangement of a data transform apparatus according to the third modification of the second embodiment.

FIG. 14 shows the arrangement according to the third modification of the second embodiment. FIG. 14 can be construed as an arrangement in which the sign inverter 108 is moved to the input side in the arrangement of FIG. 13, or as an arrangement in which substitutions from the arrangement of FIG. 11 to FIG. 13 are applied to FIG. 12. Hence, as can be seen from the above description, the arrangement of FIG. 14 is equivalent to FIG. 12, and a description thereof will not be repeated.

Figure 15:
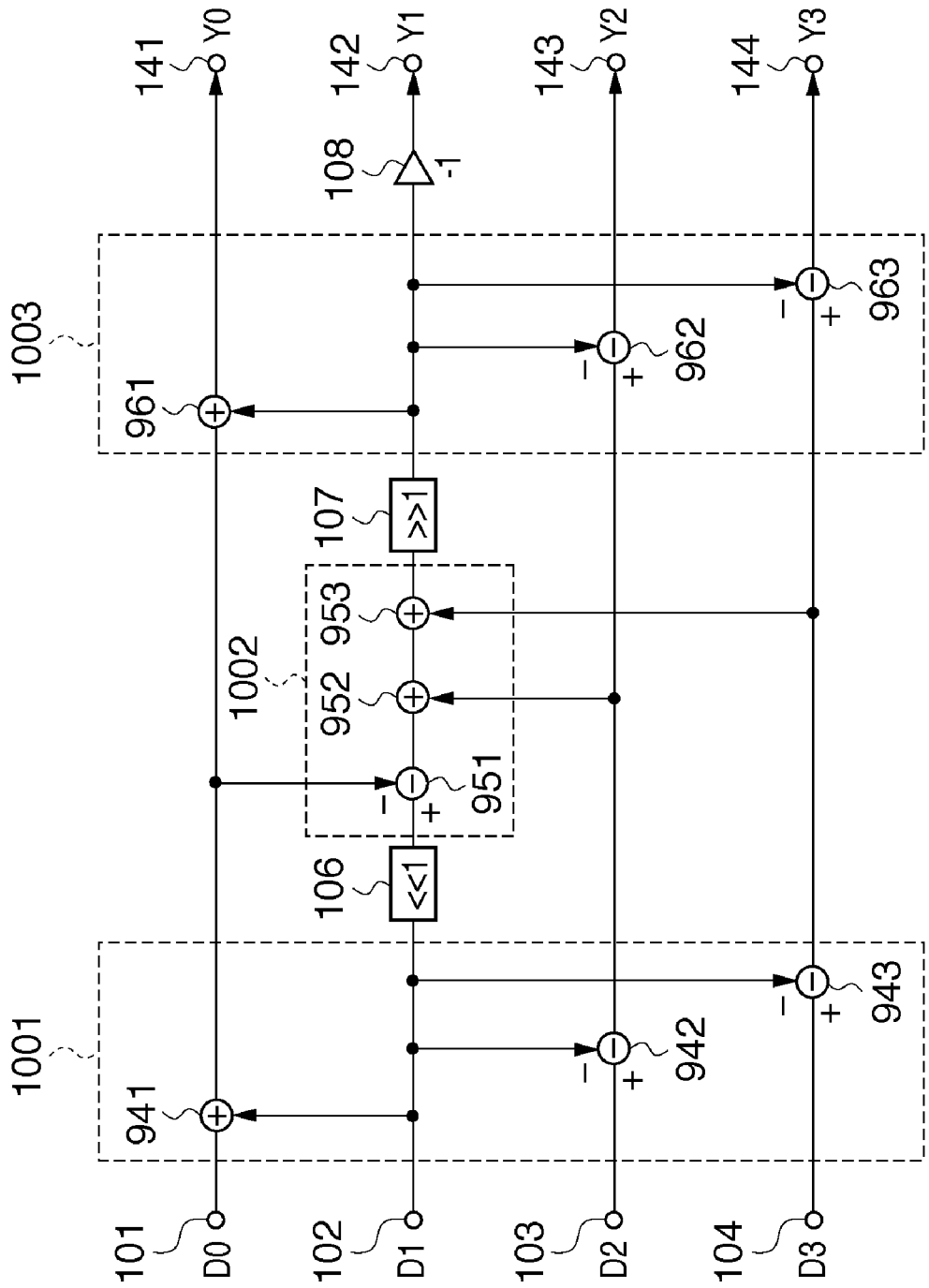
FIG. 15 is a circuit diagram showing the arrangement of a data transform apparatus which implements a lossless 4-point Hadamard transform according to the third embodiment.

FIG. 15 shows the arrangement according to the third embodiment of the present invention.

In the first and second embodiments and their modifications described so far, a focus of the calculations is the DC coefficient.

More specifically, data to be commonly added or subtracted is output as DC coefficient data Y0 from the output terminal 141 by applying various calculations to data D0 input from the input terminal 101 in the first to third calculation unit groups.

In this embodiment, data to be commonly added to or subtracted from is data on a path which applies calculations to data input from the terminal 102 and outputs that data as an AC coefficient from the output terminal 142. This is the largest feature of the third embodiment.

Referring to FIG. 15, reference numerals 941 to 943 respectively denote one adder and two subtractors, which form a first calculation unit group 1001. Reference numeral 951 to 953 respectively denote one subtractor and two adders which are arranged on a second path and form a second calculation unit group 1002. Reference numerals 961 to 963 respectively denote one adder and two subtractors which form a third calculation unit group 1003. As for other components, the same reference numerals denote components having functions common to those in FIG. 1, and a repetitive description thereof will not be made.

As in the first embodiment, the calculation contents in the third embodiment will be described.

The adder 941 and the subtractors 942 and 943 which form the first calculation unit group 1001 add input data D1 to input data D0, and subtract the input data D1 from input data D2 and D3, respectively. As the addition and subtraction results, D0+D1, −D1+D2, and −D1+D3 are generated.

A shifter 106 shifts the input data D1 1 bit to the left.

The subtractor 951 and the adders 952 and 953 which form the second calculation unit group 1002 subtract or add the aforementioned three calculation results from or to the output from the shifter 106. This calculation result is given by:

$$(D1 \ll 1) - (D0 + D1) + (-D1 + D2) + (-D1 + D3) = \quad (10)$$
$$2 \cdot D1 - D0 - 3 \cdot D1 + D2 + D3 = -D0 - D1 + D2 + D3$$

As can be seen from the above description, the value of equation (10) above is a "−2-fold" value of a certain AC coefficient. Hence, a shifter 107 shifts the value obtained by this equation (10) 1 bit to the right, and a sign inverter 108 inverts the sign of the output from the shifter 107, thus obtaining AC coefficient data Y1. This AC coefficient data Y1 is given by:

$$Y1 = -((-D0 - D1 + D2 + D3) \gg 1) \quad (11)$$
$$= (D0 + D1 - D2 - D3 + 1) \gg 1$$

"+1" in the calculation of equation (11) is to set round-up processing as round processing, and this calculation is the same as equation (6) in the first embodiment.

The data before sign inversion in equation (11), i.e., (−D0−D1+D2+D3)≫1, is added to or subtracted from the respective calculation results of the first calculation unit group 1001 by the adder 961 and the subtractors 962 and 963 which form the third calculation unit group 1003. With these addition and subtractions, DC coefficient data Y0, and remaining two AC coefficient data Y2 and Y3 are obtained, as respectively given by:

$$Y0 = D0 + D1 + ((-D0 - D1 + D2 + D3) \gg 1) \quad (12)$$
$$= (2 \cdot D0 + 2 \cdot D1 - D0 - D1 + D2 + D3) \gg 1$$
$$= (D0 + D1 + D2 + D3) \gg 1$$

$$Y2 = -D1 + D2 - ((-D0 - D1 + D2 + D3) \gg 1) \quad (13)$$
$$= -D1 + D2 + ((+D0 + D1 - D2 - D3 + 1) \gg 1)$$
$$= (-2 \cdot D1 + 2 \cdot D2 + D0 + D1 - D2 - D3 + 1) \gg 1$$
$$= (D0 - D1 + D2 - D3 + 1) \gg 1$$

$$Y3 = -D1 + D3 - ((-D0 - D1 + D2 + D3) + \gg 1) \quad (14)$$
$$= -D1 + D3 + ((+D0 + D1 - D2 - D3 + 1) \gg 1)$$
$$= (-2 \cdot D1 + 2 \cdot D3 + D0 + D1 - D2 - D3 + 1)) \gg 1$$
$$= (D0 - D1 - D2 + D3 + 1) \gg 1$$

As in equations (13) and (14), transform coefficients obtained by subtracting truncated transform coefficient data apparently become rounded-up transform coefficient data.

By contrast, as in equation (12), a transform coefficient generated by adding truncated transform coefficient data apparently becomes truncated transform coefficient data.

Since the four transform coefficient outputs include one apparently truncated data and three rounded-up data, the transform coefficients become lossless transform coefficients.

In the third embodiment, data to be commonly added or subtracted is data on a path which applies calculations to data D1 input from the input terminal 102 and outputs that data as AC coefficient data Y1 from the output terminal 142.

In addition to the data on the above path, data on a path which inputs data from the input terminal 103 and outputs it from the output terminal 143, or that on a path which inputs data from the input terminal 104 and outputs it from the output terminal 144 may be used as the data to be commonly added or subtracted. This is because the three AC coefficients are equivalent to each other, and a method applicable to a certain AC coefficient can be applied to either of the remaining two AC coefficients. It is redundant to describe application examples to the remaining two AC coefficients in this specification, and a description thereof will not be given.

Figure 16:
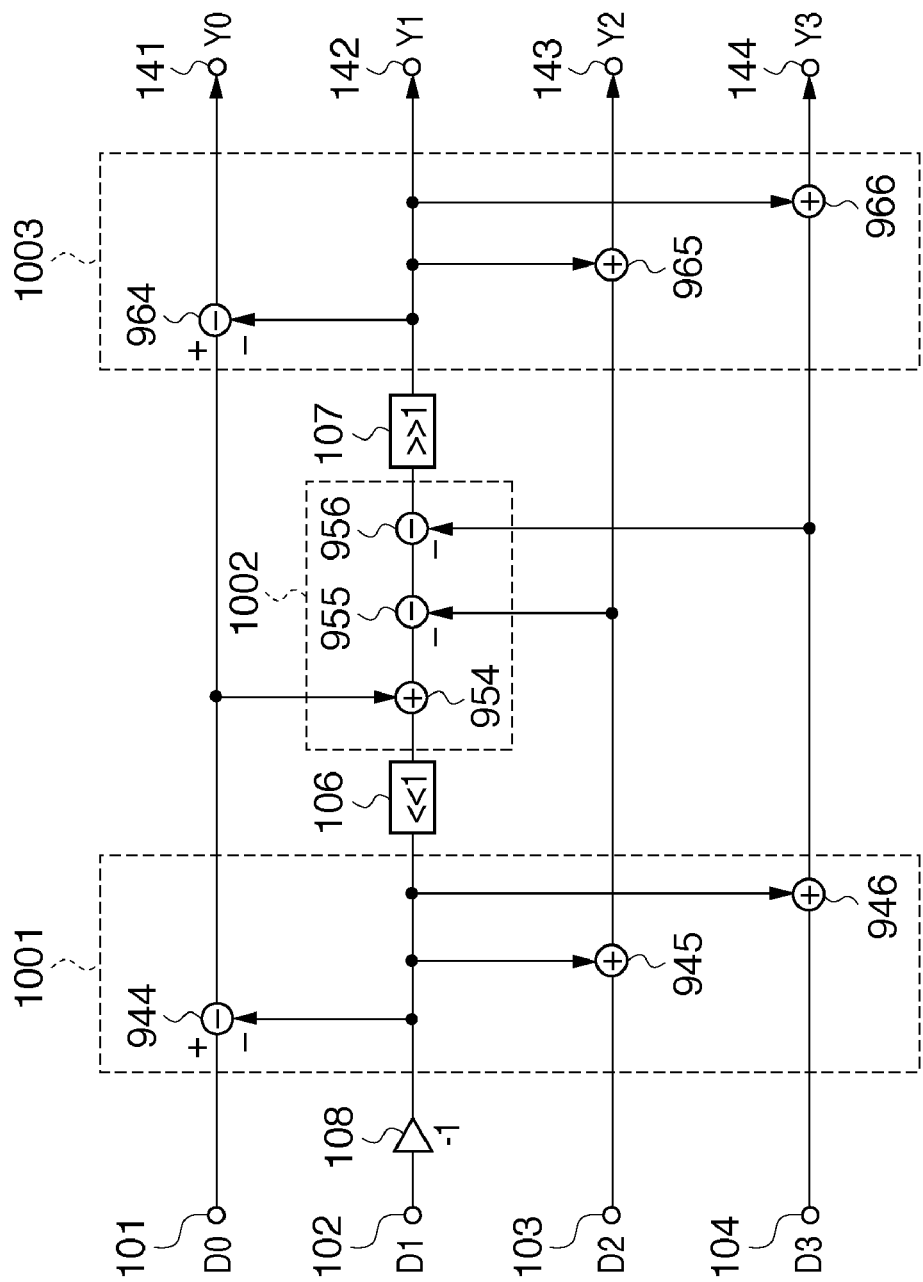
FIG. 16 is a circuit diagram showing the arrangement of a data transform apparatus according to the first modification of the third embodiment.

FIG. 16 shows the first modification of the third embodiment.

In the arrangement of FIG. 16, the sign inverter 108 is moved to the input side in the arrangement of FIG. 15.

Referring to FIG. 16, reference numerals 944 to 946 respectively denote one subtractor and two adders which form the first calculation unit group 1001. Reference numerals 954 to 956 respectively denote one adder and two subtractors which are arranged on the second path and form the second calculation unit group 1002. Reference numerals 964 to 966 respectively denote one subtractor and two adders which form the third calculation unit group 1003. As for other components, the same reference numerals denote components having functions common to those in FIG. 15, and a repetitive description thereof will not be made.

The relationship between FIGS. 15 and 16 is just the same as that between FIGS. 2 and 4. Hence, the round processes for the output transform coefficients in FIG. 16 are contradictory to those in FIG. 15. As can be understood from the above description, since there are one rounded-up transform coefficient and three truncated transform coefficients, these transform coefficients become lossless transform coefficients.

The embodiments and their modifications have been explained.

As described in reference 1 presented previously, the lossless DCT transforms can be efficiently implemented using the lossless-Hadamard transforms. The lossless DCT transforms can be implemented more efficiently using the lossless-Hadamard transforms according to this embodiment.

When the lossless DCT transform coefficients are quantized and entropy-encoded, lossy encoding compatible to JPEG can be implemented. When those transform coefficients are encoded without quantization, lossless encoding can be literally implemented.

That is, the same transform processing can seamlessly switch lossy encoding and lossless encoding depending on the presence/absence of quantization processing. When transform coefficients are encoded without quantization, if they undergo a lossless inverse transform upon decoding, original image data can be perfectly reclaimed. When encoded transform coefficients undergo general DCT inverse transform processing in place of lossless inverse transform processing, image data close to original data can be reclaimed.

In the present invention, an integer is consistently used as each input data. However, fixed-floating point data may be obviously used as the input data.

When input data having n bits as a fractional part undergoes lossless transform processing based on the present invention, a lossless transform coefficient also becomes data having n bits as a fractional part.

The position of the decimal point is a problem of data interpretation, and is not particularly limited as long as the decimal point is similarly moved between input and output data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-294881 filed on Nov. 13, 2007, which is hereby incorporated by reference herein in its entirety.

What is claimed is:

1. A data transform apparatus, which transforms four transform target data, which are input to first to fourth input terminals and are represented by integers, into one DC coefficient data and three AC coefficient data on a frequency space, which are represented by integers, and outputs the transform results as lossless-Hadamard transform coefficients from first to fourth output terminals, the apparatus comprising:

when a path which couples the first input terminal that inputs one transform target data of the four transform target data and the first output terminal that outputs the DC coefficient data is defined as a first path, and paths which respectively couple the second to fourth input terminals that input three transform target data except for the one transform target data and the second to fourth output terminals that output the three AC coefficient data are defined as second to fourth paths, a sign inverter which is arranged on the first path and inverts a sign of input data;

a converter which is arranged on the first path, and doubles a value of input data;

a first calculation unit group which is arranged on the second to fourth paths, and adds or subtracts data to be supplied to said converter to or from the three transform target data;

a second calculation unit group which is arranged at a position closer to the first output terminal side than said converter on the first path, and subtracts or adds three calculation results by said first calculation unit group from or to the conversion result of said converter;

a rounding unit which is arranged at a position closer to the first output terminal side than said second calculation unit group on the first path, halves an output from said second calculation unit group, converts the halved output to an integer by rounding up or truncating a fractional part, and outputs the integer data toward the first output terminal; and a third calculation unit group which is arranged on the second to fourth paths, subtracts or adds data between said rounding unit and the first output terminal from or to three data obtained by said first calculation unit group, and outputs results to the second to fourth output terminals, wherein data supplied to the first output terminal is output as DC coefficient data, and three data supplied to the second to fourth output terminals are output as AC coefficient data.

2. A method of controlling a data transform apparatus, which transforms four transform target data, which are input to first to fourth input terminals and are represented by integers, into one DC coefficient data and three AC coefficient data on a frequency space, which are represented by integers, and outputs the transform results as lossless-Hadamard transform coefficients from first to fourth output terminals, the method comprising:

when a path which couples the first input terminal that inputs one transform target data of the four transform target data and the first output terminal that outputs the DC coefficient data is defined as a first path, and paths which respectively couple the second to fourth input terminals that input three transform target data except for the one transform target data and the second to fourth output terminals that output the three AC coefficient data are defined as second to fourth paths, a sign inversion step of controlling a sign inverter, which is arranged on the first path, to invert a sign of input data;

a conversion step of controlling a converter, which is arranged on the first path, to double a value of input data;

a first calculation step of controlling a first calculation unit group, which is arranged on the second to fourth paths, to add or subtract data to be supplied to the converter to or from the three transform target data;

a second calculation step of controlling a second calculation unit group, which is arranged at a position closer to the first output terminal side than the converter on the first path, to subtract or add three calculation results by the first calculation unit group from or to the conversion result of the converter;

a rounding step of controlling a rounding unit, which is arranged at a position closer to the first output terminal side than the second calculation unit group on the first path, to halve an output from the second calculation unit group, convert the halved output to an integer by rounding up or truncating a fractional part, and output the integer data toward the first output terminal; and a third calculation step of controlling a third calculation unit group, which is arranged on the second to fourth paths, to subtract or add data between the rounding unit and the first output terminal from or to three data obtained by the first calculation unit group, and output results to the second to fourth output terminals, wherein data supplied to the first output terminal is output as DC coefficient data, and three data supplied to the second to fourth output terminals are output as AC coefficient data.

* * * * *